United States Patent Office 3,494,950
Patented Feb. 10, 1970

3,494,950
METHYL-(ACYLOXYMETHYL)-ACYLOXY-SILICON COMPOUNDS
Walter Simmler, Odenthal-Schlinghofen, Hans Sattlegger, Cologne-Buchheim, and Hans Niederprüm, Monheim, Germany, assignors to Farbenfabriken Bayer Aktiengesellschaft, Leverkusen, Germany, a corporation of Germany
No Drawing. Filed May 25, 1966, Ser. No. 552,705
Claims priority, application Germany, June 26, 1965, F 46,445
Int. Cl. C07f 7/08; C08f 11/04
U.S. Cl. 260—448.2               7 Claims

ABSTRACT OF THE DISCLOSURE

Novel methyl-(acyloxymethyl)-acyloxy-silicon compounds of the formula:

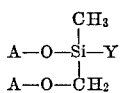

wherein Y designates $CH_3$, O—A

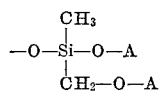

and O—A is a carboxylic acid radical. The novel compounds are prepared by adding to a mixture of a methyl-(halomethyl)-chlorosilane having the formula:

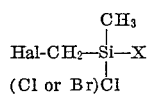

wherein X is $CH_3$ or Cl and a tertiary amine in an amount at least stoichiometrically equivalent to the total halogen content of the silane, a mono- or dicarboxylic acid in an amount whereby the added carboxyl groups are equal to the total number of halogen atoms in the silane. The novel compounds find use as intermediates for modifying silanol functional organopolysiloxanes with acyl groups and are suitable for application as intermediate layers facilitating the adhesion of synthetic resins to surfaces of silicate nature.

---

This invention relates to new silicon- and carbofunctional carboxylic acid derivatives, and to a process for their production.

The new compounds according to the present invention are methyl-(acyloxymethyl)-acyloxy-silicon compounds of the formula

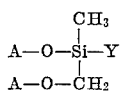

wherein Y is $CH_3$, —O—A or

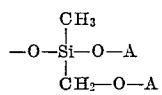

and O—A is a carboxylic acid radical.

The carboxylic acid radical O—A may be derived from a saturated or unsaturated aliphatic acid or from an aromatic mono- or di-basic acid. Examples of such monobasic carboxylic acids are formic, acetic, propionic, stearic, methacrylic and benzoic acids. In the case of dibasic carboxylic acids, for example oxalic, glutaric, adipic, phthalic, isophthalic and terephthalic acids, two symbols O—A taken together denote the bivalent radical of these dicarboxylic acids. In this way, either two Si—CH₂ groups are linked with one another to form chains, e.g. of structural units of the formula

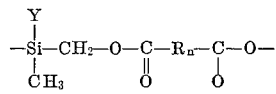

or a ring closure occurs on one Si—CH₂ group, e.g. according to the formula

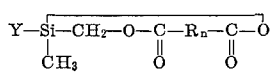

in which R is an alkylene radical with 1 to 4 carbon atoms or a phenylene radical, and $n$ is 0 or 1.

The present invention also provides a process for the production of the novel compounds defined above, which process comprises gradually adding to a mixture of a methyl-(halomethyl)-chlorosilane of the formula

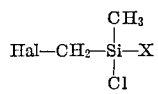

in which Hal is Cl or Br and X is $CH_3$ or Cl, and a tertiary amine in an amount at least stoichiometrically equivalent to the total halogen content of the silane, a mono- or dicarboxylic acid in such an amount that the number of added carboxyl groups is equal to the total number of halogen atoms in the silane.

The reaction proceeds exothermically, and the temperature of reaction is not critical. Where the carboxylic acid is acetic acid, for example, reaction commences even at —20° C. Since no advantage is gained by allowing the temperature to rise above 100° C., it is recommended to control the course of the reaction by means of the speed at which the acid is admixed, by external cooling or by using an inert solvent. The use of a solvent, e.g. toluene or xylene, moreover offers the advantage that the hydrogen halide salt of the amine precipitated in the reaction can more easily be filtered off. Triethylamine is a suitable tertiary amine.

The new compounds of the invention are especially suitable for application as intermediate layers facilitating the adhesion of synthetic resins to surfaces of silicate nature. They may also serve as intermediate products for modifying silanol-functional organopolysiloxanes with acyl groups or for producing acyloxymethyl-substituted organopolysiloxanes by cohydrolysis with chloro-, alkoxy- or other acyloxy-silanes.

It was not to be foreseen that the reaction according to the invention could be carried out easily and smoothly, because it is known that halomethyl-substituted alkoxysilanes and siloxanes can in practice be acylated only above 50° C., preferably between 100 and 175° C., and that, on the other hand, acyloxy-silicon compounds split off carboxylic acid anhydrides on heating, siloxane condensation taking place. The Si-functional acylation and the C-functional acylation thus seemed to exclude one another. It must, therefore, be assumed that in the process described above acylation first takes place on the silicon atom and this increases the reactivity of the adjacent halomethyl group so that readily distillable products are finally obtained in good yield.

The following examples are given for the purpose of illustrating the invention.

EXAMPLE 1

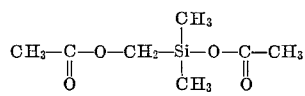

240 grams (4 mols) glacial acetic acid are added dropwise over a period of 30 minutes at room temperature, while stirring, to a mixture of 376 g. (2 mols) dimethyl-(bromomethyl)-chlorosilane, 404 g. (4 mols) triethylamine and 3 litres toluene, and the mixture is then heated at boiling temperature under reflux for 3 hours. The precipitated salts are then separated by filtration and the filtrate is fractionally distilled under reduced pressure. Dimethyl-(acetoxymethyl)-acetoxy-silane, of refractive index $n_D^{20}=1.4230$, is obtained at 65° C. and 3 mm. Hg in a yield of 84% theoretical.

Elementary analysis of the product gives 44.25% C and 7.49% H; the saponification number is 573.

Calculated for $C_7H_{14}O_4Si$: 44.19% C and 7.42% H; saponification number: 589.

EXAMPLE 2

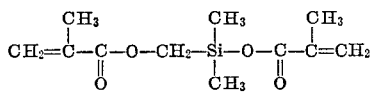

A mixture of 258 g. (3 mols) anhydrous methacrylic acid and 10 g. pyrogallol (for stabilization) is added dropwise over a period of 30 minutes at room temperature, while stirring, to a mixture of 281 g. (1.5 mols) dimethyl-(bromoethyl)-chlorosilane, 303 g. (3 mols) triethylamine and 2.8 litres toluene, and the mixture is then further treated as described in Example 1. Dimethyl-(methacryloxymethyl)-methacryloxy-silane, of refractive index $n_D^{20}=1.4510$, is obtained at 83° C. and 1.4 mm. Hg in a yield of 47% theoretical.

Elementary analysis of the product gives 54.31% C; 7.49% H; 11.75% Si.

Calculated for $C_{11}H_{18}O_4Si$: 54.40% C; 7.44% H; 11.59% Si.

The loss in yield is caused by the strong tendency of the compound to polymerize, for the initial halogen content is found almost completely as an ionic halide in the filter residue.

EXAMPLE 3

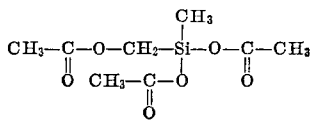

(I)

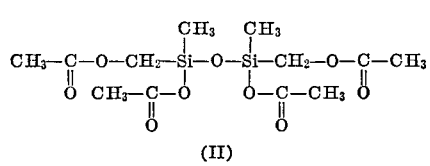

(II)

360 grams (6 mols) glacial acetic acid are added dropwise over a period of 30 minutes at room temperature, while stirring, to a mixture of 414 g. (2 mols) methyl-(bromomethyl)-dichlorosilane, 606 g. (6 mols) triethylamine and 6 litres toluene, and the mixture is further treated as described in Example 1. Methyl-(acetoxymethyl)-diacetoxy-silane (I), of refractive index $n_D^{20}=1.4270$, is obtained at 77° C. and 0.6 mm. Hg in a yield of 57% theoretical, and is confirmed by magnetic proton resonance.

On continuing the distillation, 1,3-dimethyl-1,3-di-(acetoxymethyl)-diacetoxy-disiloxane (II) is obtained as last runnings; this is a condensation product derived from the above main product (I) by the splitting off of acetic anhydride.

EXAMPLE 4

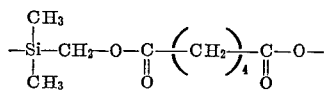

187.5 g. (1 mol) dimethyl-(bromomethyl)-chlorosilane are added dropwise over a period of one hour to a solution of 146 g. (1 mol) adipic acid and 243 g. (2.4 mols) triethylamine in 2 litres anhydrous toluene, and the mixture is then heated at boiling temperature under reflux for 4 hours. The precipitated salts are then separated by filtration, the filter residue is washed with benzene and all volatile components are evaporated from the combined filtrates by heating up to 80° C. at 1 mm. Hg. As reaction product there remain 192 g. (about 89% theoretical) of a viscous polyester essentially consisting of alternating adipic acid anhydride units and dimethyl-(oxymethyl)-silyl units; its refractive index $n_D^{20}$, is 1.4723, its saponification number is 475 (calculated: 520), and its halogen content is less than 0.1 percent by weight.

What we claim is:

1. A methyl-(acyloxymethyl)-acyloxy-silicon compound of the general formula:

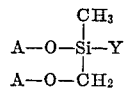

wherein Y is $CH_3$, O—A or

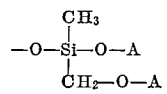

and O—A is a carboxylic acid radical selected from the group consisting of acetic, methacrylic, adipic and terephthalic acid radicals.

2. Dimethyl-(acetoxymethyl)-acetoxy-silane.
3. Dimethyl - (methacryloxymethyl) - methacryloxy-silane.
4. Methyl-(acetoxymethyl)-diacetoxy-silane.
5. 1,3-dimethyl-1,3-di-(acetoxymethyl) - diacetoxy-disiloxane.
6. A polymer consisting essentially of recurring structural units of the formula:

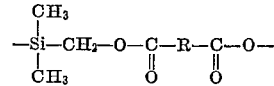

in which R is an alkylene radical having 1 to 4 carbon atoms or a phenylene radical.

7. A polymer consisting essentially of recurring units of the formula:

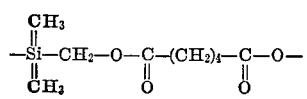

References Cited

UNITED STATES PATENTS

| | | |
|---|---|---|
| 3,371,104 | 2/1968 | Rossmy et al. |
| 2,582,568 | 11/1952 | Speier. |
| 2,770,632 | 11/1956 | Merker. |
| 2,922,806 | 1/1960 | Merker. |
| 2,956,044 | 10/1960 | Merker _____ 260—448.2 X |
| 3,161,664 | 12/1964 | Depree _____ 260—448.2 X |
| 3,249,464 | 5/1966 | Nelson et al. ____ 260—448.2 X |
| 3,317,369 | 5/1967 | Clark et al. _____ 260—448.2 X |

OTHER REFERENCES

Bazant et al., "Organosilicon Compounds," vol. 1, Academic Press, N.Y. (1965), p. 61.

"Russian Chemical Reviews" (Uspekhi Khimii), 7, July 1960, pp. 383–394.

"Chemical Abstracts," 50, p. 3298 (1956).

Bazant et al., "Organosilicon Compounds," vol. 1, Academic Press, N.Y. (1965), pp. 408–409; 492–493.

DELBERT E. GANTZ, Primary Examiner

P. F. SHAVER, Assistant Examiner

U.S. Cl. X.R.

117—54, 69, 123; 260—46.5